United States Patent
Ishikawa

(10) Patent No.: US 12,504,967 B2
(45) Date of Patent: Dec. 23, 2025

(54) SERVER, NON-TRANSITORY STORAGE MEDIUM, AND SOFTWARE UPDATE METHOD

(71) Applicant: TOYOTA JIDOSHA KABUSHIKI KAISHA, Toyota (JP)

(72) Inventor: Tomoyasu Ishikawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 159 days.

(21) Appl. No.: 18/341,808

(22) Filed: Jun. 27, 2023

(65) Prior Publication Data

US 2024/0069897 A1  Feb. 29, 2024

(30) Foreign Application Priority Data

Aug. 30, 2022  (JP) ................ 2022-136858

(51) Int. Cl.
  *G06F 8/65* (2018.01)
  *H04L 67/12* (2022.01)

(52) U.S. Cl.
  CPC .......... *G06F 8/65* (2013.01); *H04L 67/12* (2013.01)

(58) Field of Classification Search
  CPC ... G06F 8/60–66; H04L 41/082; H04L 67/12; H04W 8/245; H04W 4/40
  USPC ................................ 717/168–178
  See application file for complete search history.

(56) References Cited

U.S. PATENT DOCUMENTS

| | | | |
|---|---|---|---|
| 2021/0141629 A1 | 5/2021 | Ariga et al. | |
| 2023/0289171 A1* | 9/2023 | Abdelaziz | ............... G06F 21/34 |

FOREIGN PATENT DOCUMENTS

| | | | | |
|---|---|---|---|---|
| EP | 4160392 A1 * | 4/2023 | ........ | B60W 50/0098 |
| JP | 2017149323 A | 8/2017 | | |
| JP | 2018206051 A | 12/2018 | | |
| JP | 2021077319 A | 5/2021 | | |
| JP | 7379892 B2 * | 11/2023 | ........... | G06F 21/572 |
| WO | WO-2022188069 A1 * | 9/2022 | ............ | G06F 21/00 |

OTHER PUBLICATIONS

OTA Software Update, 3 pages, Dec. 2021, [retrieved on Jul. 8, 2025], Retrieved from the Internet: <URL:https://web.archive.org/web/20211201130318/https://www.genesis.com/content/dam/genesis-p2/kr/assets/members/digital-services/genesis-ota/genesis-OTA-software-update-manual-en.pdf>.*

* cited by examiner

*Primary Examiner* — Geoffrey R St Leger
(74) *Attorney, Agent, or Firm* — Dickinson Wright, PLLC

(57) ABSTRACT

A server is configured to update software of a control device of a vehicle through wireless communication. The server includes: one or more memories storing a program; and one or more processors configured to execute the program, wherein the one or more processors are configured to control, according to content of the software update, whether to send license information to the vehicle or to send the license information to a user terminal that is operable by a user who has administrator rights on the vehicle, the license information being information for obtaining approval for the software update from the user.

11 Claims, 10 Drawing Sheets

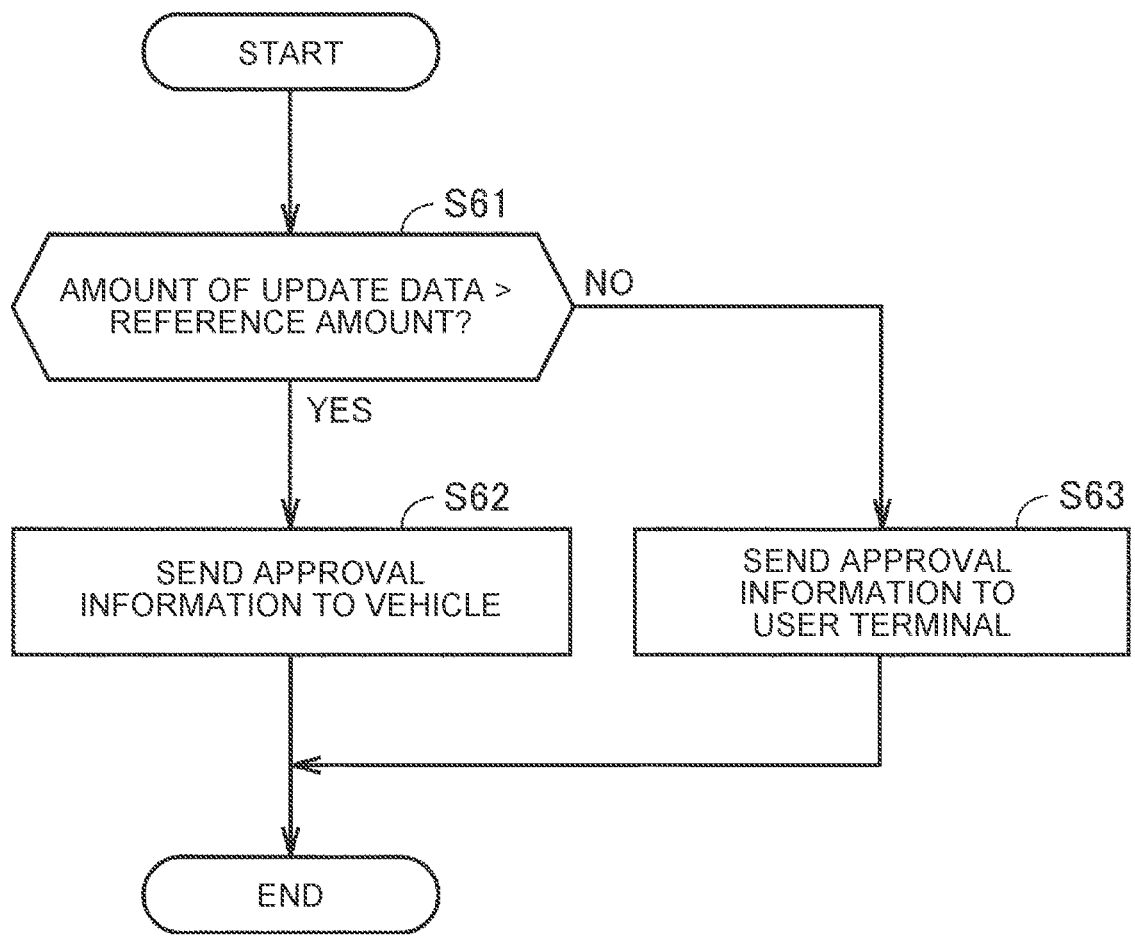

SERVER, NON-TRANSITORY STORAGE MEDIUM, AND SOFTWARE UPDATE METHOD

CROSS-REFERENCE TO RELATED APPLICATION

This application claims priority to Japanese Patent Application No. 2022-136858 filed on Aug. 30, 2022, incorporated herein by reference in its entirety.

BACKGROUND

1. Technical Field

The present disclosure relates to a server, a non-transitory storage medium, and a software update method.

2. Description of Related Art

Over-the-Air (OTA) technology for updating software (vehicle control programs) stored in a vehicle control device (electronic control unit (ECU)) through wireless communication has been studied and developed. For example, Japanese Unexamined Patent Application Publication No. 2017-149323 (JP 2017-149323 A) discloses a vehicle control system capable of safely updating software without impairing user convenience. When it is determined that an electronic key of a vehicle is located inside the vehicle, a mobile device sends a signal requesting a download of update software to a server. An ECU downloads, via the mobile device, the update software sent from the server and updates the software.

SUMMARY

Software updates on electric devices such as personal computers and smartphones typically require user approval. It is conceivable to obtain user approval in advance when updating software of an ECU as well. It is desirable to appropriately obtain approval from a user.

The present disclosure provides a technique for appropriately obtaining approval to update software of an ECU.

A server according to a first aspect of the present disclosure is configured to update software of a control device of a vehicle through wireless communication. The server includes: one or more memories storing a program; and one or more processors that execute the program. The one or more processors are configured to control, according to content of the software update, whether to send license information to the vehicle or to send the license information to a user terminal that is operable by a user who has administrator rights on the vehicle, the license information being information for obtaining approval for the software update from the user.

A non-transitory storage medium according to a second aspect of the present disclosure is a non-transitory storage medium storing instructions that are executable by one or more processors and that cause the one or more processors to perform functions for updating software of a control device of a vehicle through wireless communication. The functions include: sending license information to the vehicle or a user terminal that is operable by a user who has administrator rights on the vehicle, the license information being information for obtaining approval for the software update from the user; and when sending the license information, controlling whether to send the license information to the vehicle or to send the license information to the user terminal according to content of the software update.

A software update method according to a third aspect of the present disclosure is a software update method for updating software of a control device of a vehicle through wireless communication, the software update method being performed by one or more processors. The software update method includes: sending license information to the vehicle or a user terminal that is operable by a user who has administrator rights on the vehicle, the license information being information for obtaining approval for the software update from the user; and when sending the license information, controlling whether to send the license information to the vehicle or to send the license information to the user terminal according to content of the software update.

According to the present disclosure, the approval to update software of an ECU can be appropriately obtained.

BRIEF DESCRIPTION OF THE DRAWINGS

Functions, advantages, and technical and industrial significance of exemplary embodiments of the disclosure will be described below with reference to the accompanying drawings, in which like signs denote like elements, and wherein:

FIG. 10 is a flowchart showing a sixth example of the process of obtaining the user's approval for a software update.

DETAILED DESCRIPTION OF EMBODIMENTS

Hereinafter, an embodiment of the present disclosure will be described in detail with reference to the drawings. The same or corresponding parts are denoted by the same signs throughout the drawings, and description thereof will not be repeated.

Embodiment

System Configuration

Figure 1:
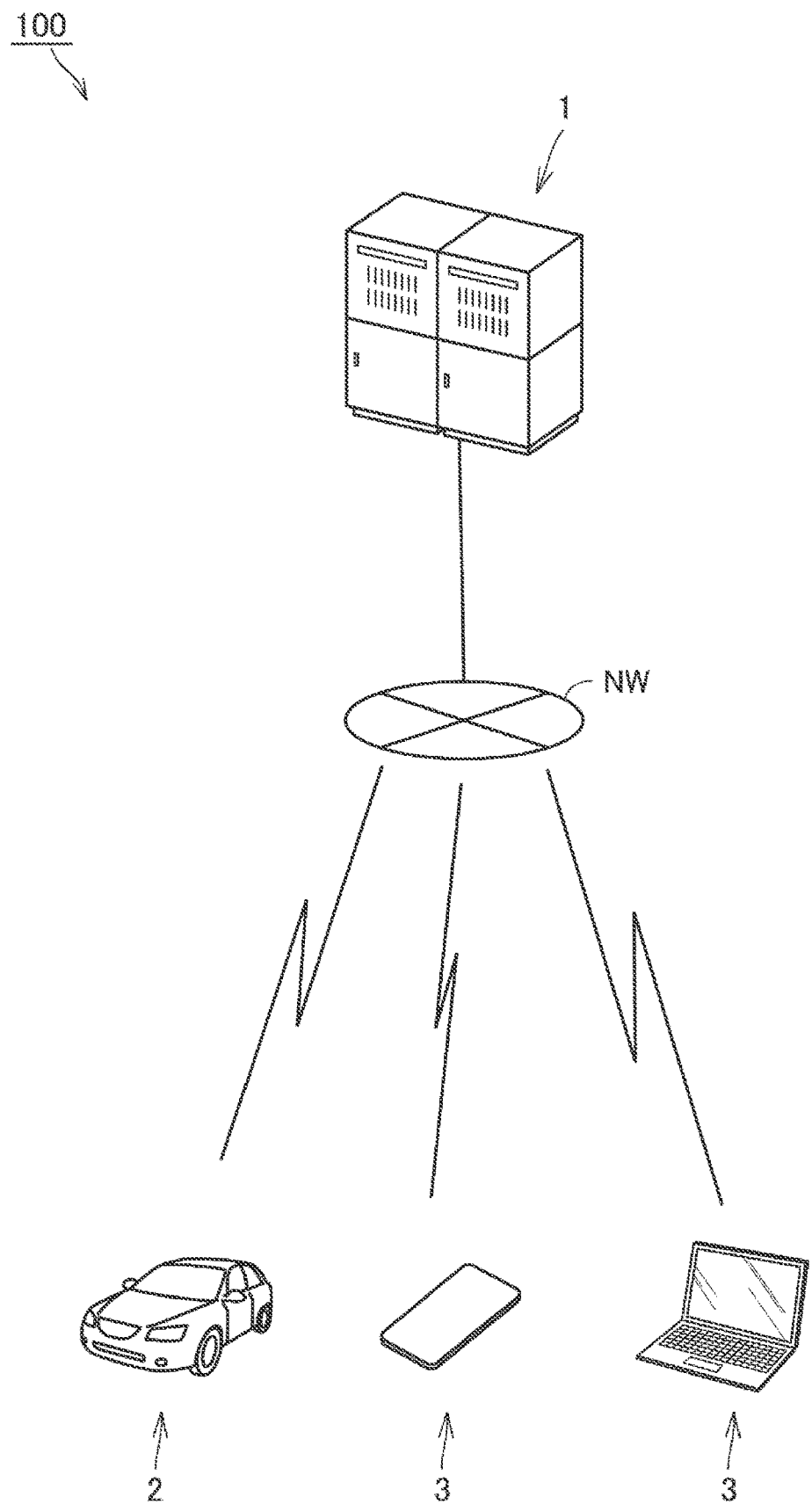
FIG. 1 shows a schematic configuration of an information processing system according to an embodiment of the present disclosure.

FIG. 1 shows a schematic configuration of an information processing system according to an embodiment of the present disclosure. An information processing system 100 includes an OTA center 1, a vehicle 2, and a user terminal 3. The OTA center 1 is connected to the vehicle 2 and the user terminal 3 via a wired or wireless network NW so that the OTA center 1 can communicate with the vehicle 2 and the user terminal 3.

The OTA center 1 is a server that provides software for ECUs (see FIG. 3) mounted on the vehicle 2. The OTA center 1 is managed by, for example, a vehicle manufacturer that manufactures a vehicle platform (VP). The configuration of the OTA center 1 will be described later with reference to FIG. 2.

The vehicle 2 is managed by a user. In other words, the user has administrator rights on the vehicle 2. In the present embodiment, it is assumed that the user is an individual (or a small number of people). However, the user may be, for example, a cooperate body that conducts business using the vehicle 2 (a transport operator etc.). The configuration of the vehicle 2 will be described later with reference to FIG. 3.

The user terminal 3 is a terminal that is operable by the user of the vehicle 2. The user terminal 3 may be a mobile terminal or a stationary terminal. Examples of the mobile terminal include smartphones, tablets, notebook personal computers (PCs), and wearable devices (smartwatches etc.). Examples of the stationary terminal include desktop PCs. The configuration of the user terminal 3 will be described later with reference to FIG. 4.

Although only one vehicle 2 is shown in FIG. 1 due to space limitations, the information processing system 100 may include any number of vehicles 2. The information processing system 100 typically includes a large number of vehicles 2. The same applies to the user terminal 3.

Figure 2:
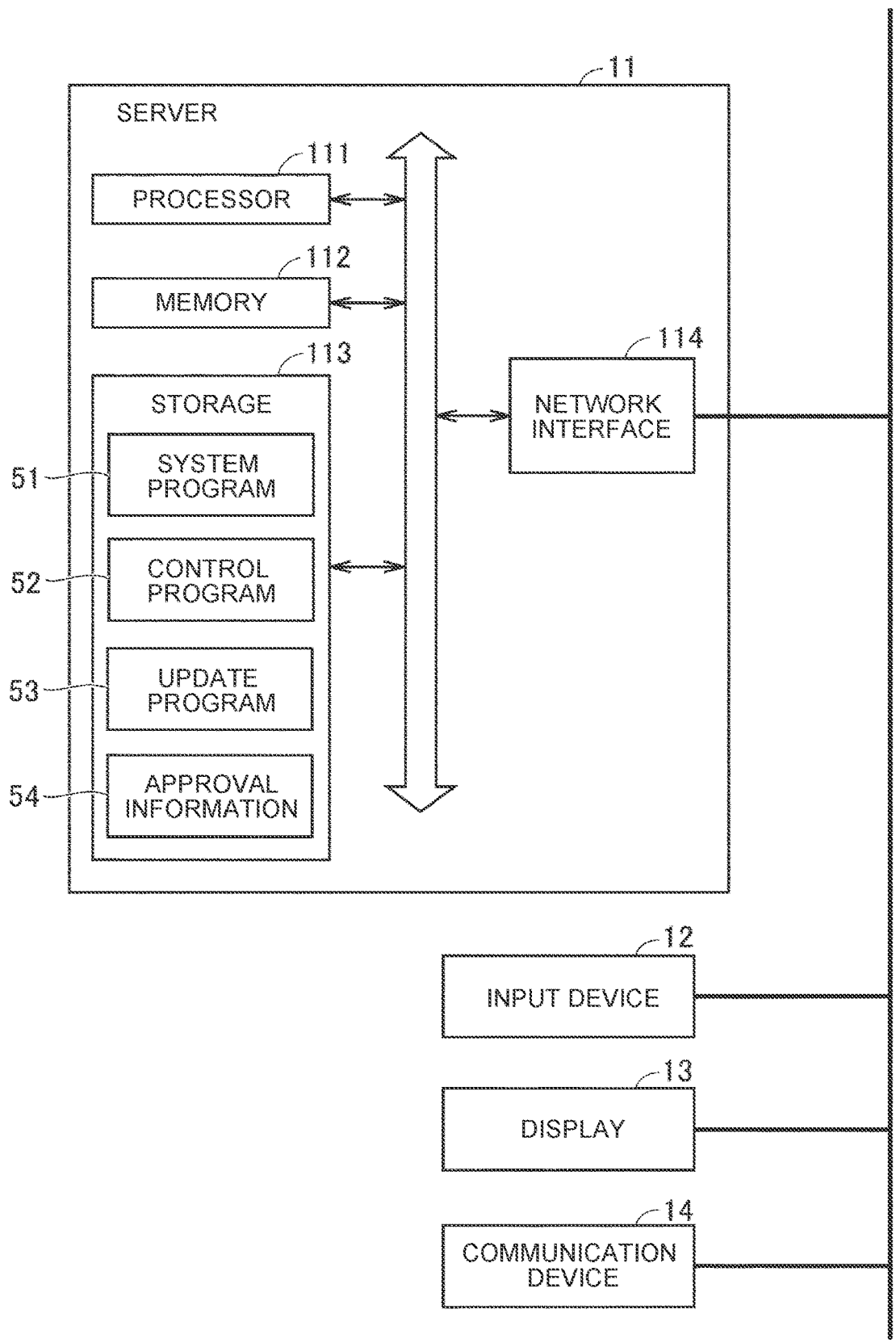
FIG. 2 is a block diagram showing a typical configuration example of an OTA center.

FIG. 2 is a block diagram showing a typical configuration example of the OTA center 1. The OTA center 1 includes a server 11, an input device 12, a display 13, and a communication device 14. The server 11 includes a processor 111, a memory 112, a storage 113, and a network interface 114. The components of the OTA center 1 are connected to each other via a communication bus.

The storage 113 is a rewritable nonvolatile memory such as a hard disk drive (HDD), a solid state drive (SSD), or a flash memory. The storage 113 stores: a system program 51 including an operating system (OS); a control program 52 including computer-readable codes necessary for control calculations; an update program 53 for updating control programs for the vehicle 2; and license information 54 (will be described later) for obtaining user's approval for a download, installation, etc. of the update program 53. The processor 111 is, for example, a central processing unit (CPU) or a micro-processing unit (MPU). The processor 111 reads the system program 51 and the control program 52, loads them into the memory 112, and executes them to implement various processes. The network interface 114 controls data communication that is performed between the server 11 and other devices (vehicle 2, user terminal 3, etc.) via the communication device 14.

The input device 12 is a keyboard, a mouse, etc. and receives input from an operator of the server 11. The display 13 displays various kinds of information to the operator of the server 11.

Although FIG. 2 shows an example in which the server 11 includes one processor 111, the server 11 may include a plurality of processors. That is, the server 11 includes one or more processors. The same applies to the memory 112 and the storage 113.

As used herein, the "processor" is not limited to a processor in a narrow sense that performs processes in a stored-program mode, and may include hardwired circuits such as application specific integrated circuits (ASICs) and field-programmable gate arrays (FPGAs). Therefore, the term "processor" may be read as processing circuitry whose processes are defined in advance by computer-readable codes and/or hardwired circuits.

Figure 3:
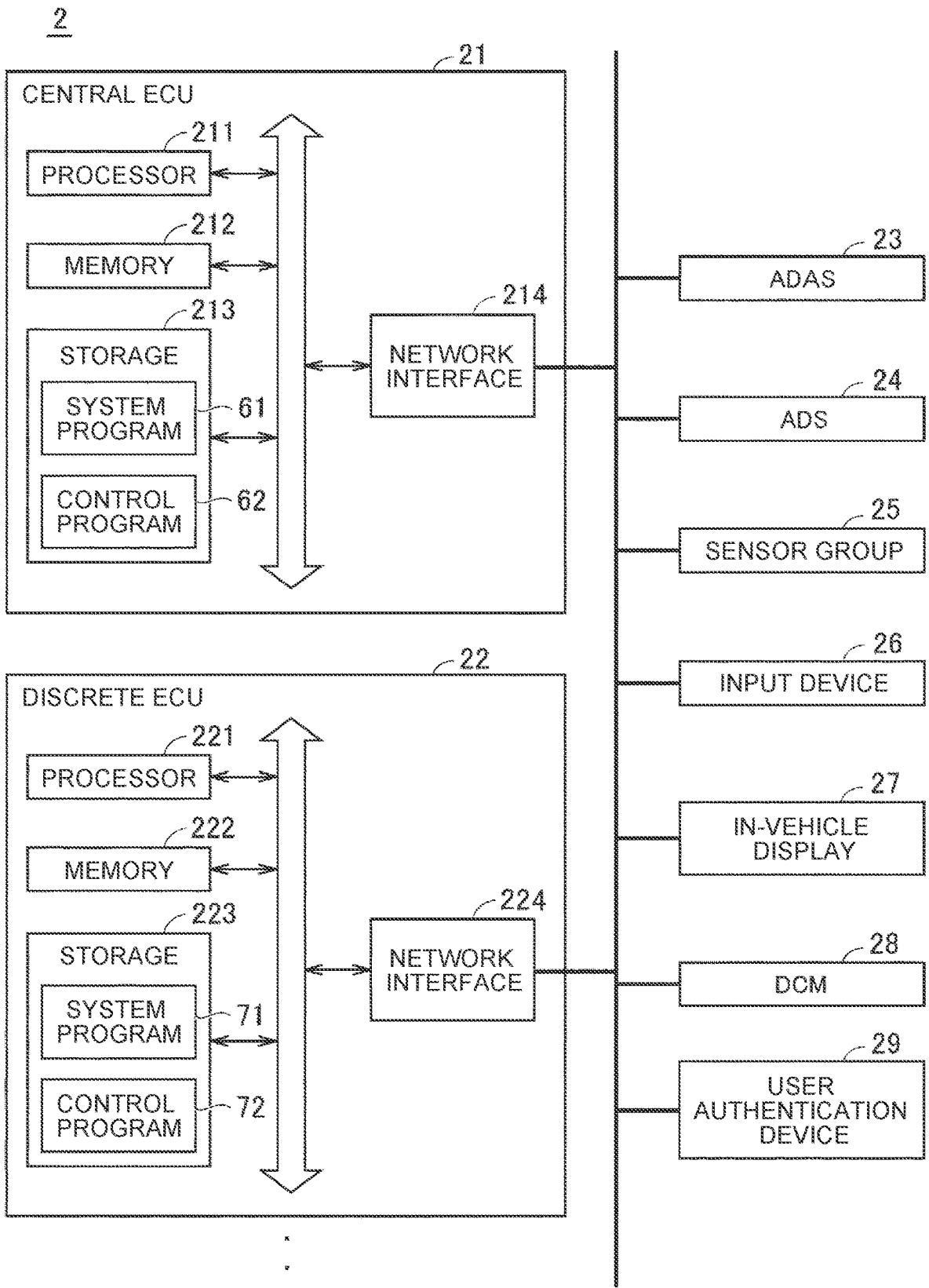
FIG. 3 is a block diagram showing a typical configuration example of a vehicle.

FIG. 3 is a block diagram showing a typical configuration example of the vehicle 2. In the present embodiment, the vehicle 2 is an autonomous vehicle. The vehicle 2 is a vehicle capable of charging with power supplied from charging equipment outside the vehicle 2 (plug-in charging or contactless charging). However, the vehicle 2 may be a vehicle that does not support autonomous driving and that can only be manually driven. The vehicle 2 may be a vehicle that supports neither plug-in charging nor contactless charging.

The vehicle 2 includes a central ECU 21, a plurality of discrete ECUs 22, an advanced driver-assistance system (ADAS) 23, an automated driving system (ADS) 24, a sensor group 25, an input device 26, an in-vehicle display 27, and a Data Communication Module (DCM) 28, and a user authentication device 29. The discrete ECUs 22 are separate ECUs for each function, and include, for example, a brake ECU, a steering ECU, a motor generator ECU, and a body ECU. The discrete ECUs 22 may be controllers storing software for implementing functions of the ADAS 23 and/or the ADS 24. The components of the vehicle 2 are connected to each other via a wired in-vehicle network such as a controller area network (CAN) or in-vehicle Ethernet (registered trademark).

The basic configurations of the central ECU 21 and the discrete ECUs 22 are similar to the configuration of the server 11. A storage 223 of each discrete ECU 22 stores software (system program 71 and control program 72) that is executed by a processor 221 of the discrete ECU 22. Each discrete ECU 22 controls a system corresponding to the discrete ECU 22 so that the vehicle 2 goes into a desired state according to signals from the sensor group 25 etc. As used herein, the system may include a braking system, a steering system, a powertrain system, a body system, etc., none of which are shown.

A processor 211 of the central ECU 21 controls a process of updating software stored in the storages 223 of the discrete ECUs 22. The central ECU 21 receives (downloads) software from the OTA center 1 via the DCM 28, and stores (installs) the downloaded software in the storage 223 of the discrete ECU 22 at an appropriate timing. The central ECU 21 then activates the installed software at an appropriate timing.

The ADAS 23 includes, for example, Adaptive Cruise Control (ACC), Auto Speed Limiter (ASL), Lane Keeping Assist (LKA), Pre-crash Safety (PCS), and Lane Departure Alert (LDA). The ADS 24 is configured to perform autonomous driving of the vehicle 2.

The sensor group 25 includes sensors configured to detect the surroundings of the vehicle 2. The sensor group 25 further includes sensors configured to detect information according to the traveling state of the vehicle 2 and detect a steering operation, an accelerator operation, and a brake operation (none of such sensors are shown). Specifically, the sensor group 25 may include, for example, a camera, a radar, a Laser Imaging Detection and Ranging (LIDAR), a vehicle speed sensor, an acceleration sensor, a yaw rate sensor, and a steering sensor (none of which are shown).

The input device 26 is, for example, a touch panel provided on a multi information display (MID). The input device 26 may be a physical switch or button. The in-vehicle display 27 is, for example, an MID. The in-vehicle display 27 may be an instrument panel to which display technology such as liquid crystal technology or organic electroluminescence (EL) technology is applied. The DCM 28 is an in-vehicle communication module. The DCM 28 is configured to allow two-way data communication between the central ECU 21 and the server 11.

The user authentication device 29 authenticates whether the person in the vehicle cabin (typically in the driver's seat) is a pre-registered user with administrator rights on the vehicle 2. The user authentication device 29 includes, for example, a camera (not shown) that can do face authentication by image processing. The method of biometric authentication by the user authentication device 29 is not particularly limited, and may be voice authentication, fingerprint authentication, vein authentication, iris authentication, etc.

Figure 4:
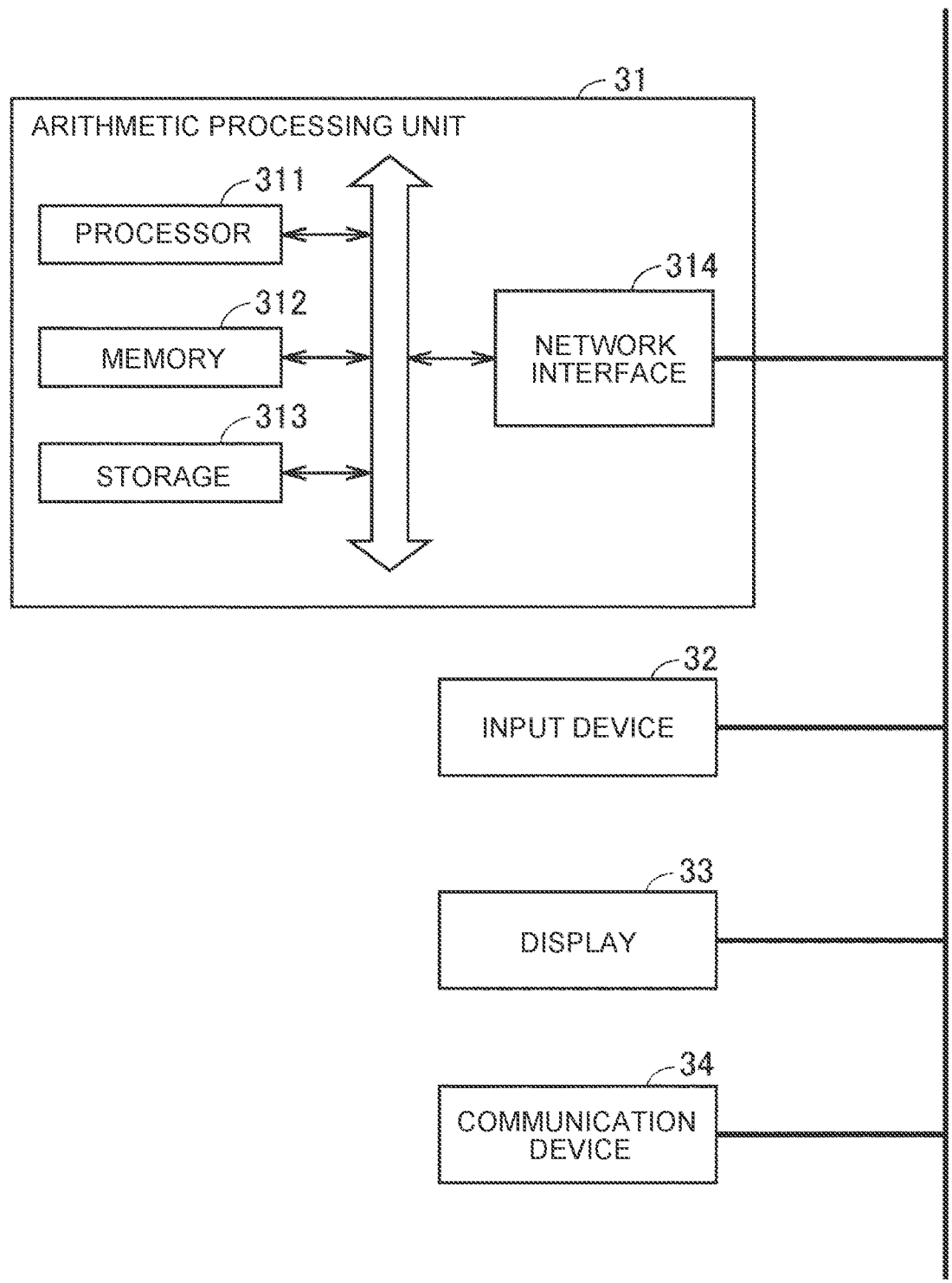
FIG. 4 is a block diagram showing a typical configuration example of a user terminal.

FIG. 4 is a block diagram showing a typical configuration example of the user terminal 3. The user terminal 3 includes an arithmetic processing unit 31, an input device 32, a display 33, and a communication device 34. The input device 32 and the display 33 are configured as an integrated unit such as a touch panel display. However, the input device 32 may be a dedicated input device (keyboard, mouse, etc.), and the display 33 may be a stationary monitor. Other configurations of the user terminal 3 are similar to those of the server 11 (see FIG. 2).

User Approval

It is desirable to obtain the user's approval before updating software of each discrete ECU 22. In the present embodiment, information for obtaining the user's approval is presented to the user. This information is hereinafter referred to as "license information." The license information includes, but is not limited to, information on a software license agreement. The license information may include information explaining the content of the software update, or may include information explaining how to use the vehicle 2 after the software update (so-called manual).

It is possible to display the license information on the in-vehicle display 27 or on the user terminal 3 (display 33). In the present embodiment, where to display the license information is controlled according to the content of the software update. More specifically, it is considered easier for many users to view the license information using the user terminal 3 they are familiar with. On the other hand, when the function to be updated by the software update is a main function of the vehicle 2, it is important to make sure to obtain approval from the user with administrator rights on the vehicle 2 (namely, the owner of the vehicle 2). For this purpose, it is suitable to use the vehicle 2. In view of such circumstances, in the present embodiment, where to display the license information is set according to the content of the software update, in other words, according to the function to be updated by the software update or the amount of update data of the software.

Process Flow

Hereinafter, six examples (first to sixth examples) will be described in detail with reference to flowcharts.

First Example

Figure 5:
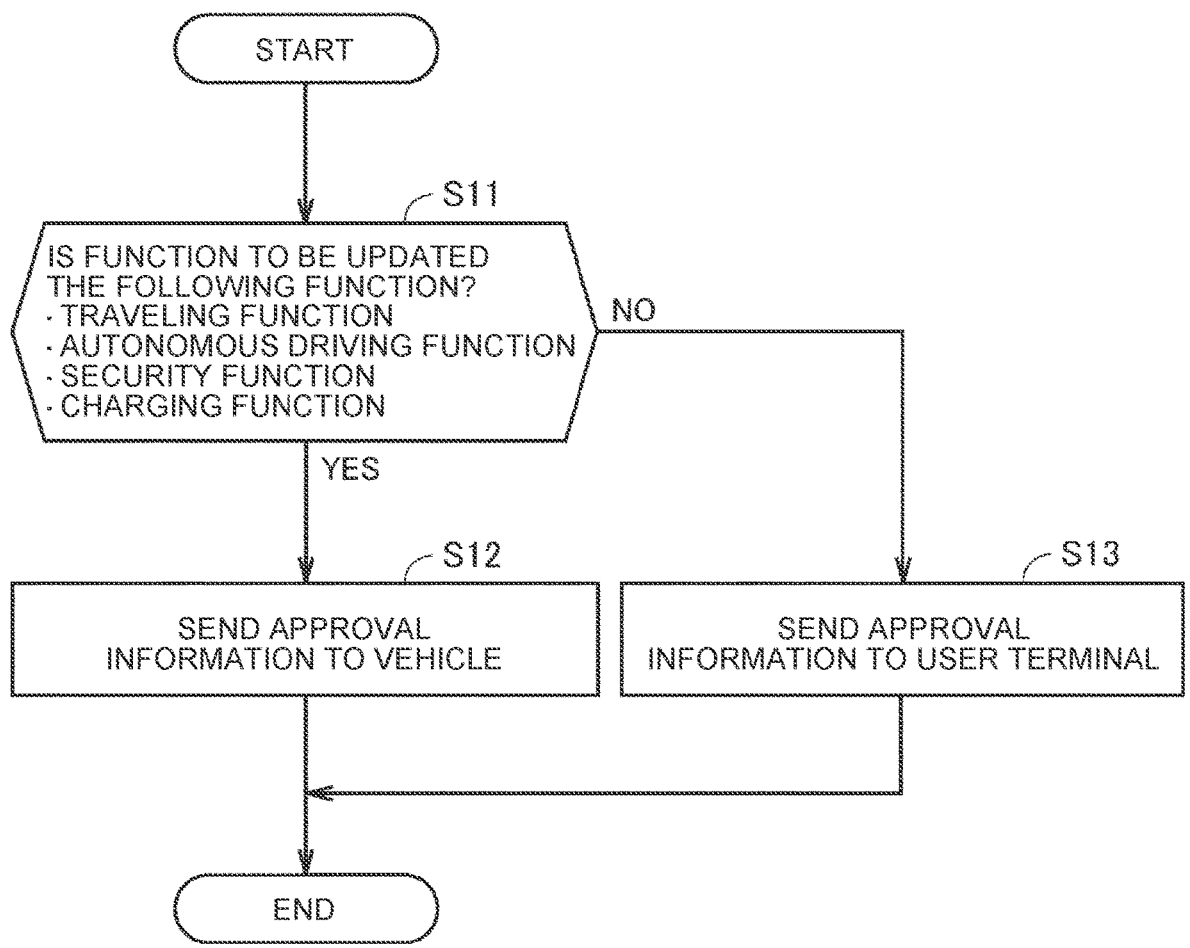
FIG. 5 is a flowchart showing a first example of a process of obtaining the user's approval for a software update.

FIG. 5 is a flowchart showing a first example of a process of obtaining the user's approval for a software update. A series of steps shown in this flowchart is performed by the server 11 of the OTA center 1 when software to be newly updated is registered in the server 11. Although the steps in the flowchart are basically implemented by software processing, part or all of them may be implemented by hardware processing. Hereinafter, the term "step" is abbreviated as "S." The same applies to the other flowcharts that will be described later.

In this example, it is assumed that a software development company (typically a vehicle manufacturer) has pre-registered what function the software to be newly updated is related to (what function the software to be newly updated is classified into).

In S11, the server 11 determines whether the function to be updated by the software update is a function related to the safety of the vehicle 2. The function related to the safety of the vehicle 2 includes, for example, at least one of the following functions of the vehicle 10: a traveling function, an autonomous driving function, a security function, and a charging function. The traveling function includes functions implemented by a brake system, a steering system, a powertrain system (none of which are shown), etc. The autonomous driving function includes functions implemented by the ADS 24. The security function includes functions implemented by a body system (not shown) (alarm function, immobilizer function, keyless function, remote starter function, etc.). The charging function includes functions implemented by a charging system (not shown) for plug-in charging or contactless charging.

When the function to be updated by the software update is a function related to the safety of vehicle 2 (YES in S11), the server 11 generates license information to be displayed on the in-vehicle display 27 and sends it to the vehicle 2 (S12). On the other hand, when the function to be updated by the software update is not a function related to the safety of vehicle 2 (NO in S11), the server 11 generates license information to be displayed on the display 33 of the user terminal 3 and sends it to the user terminal 3 (S13).

As described above, the license information regarding a main function related to the safety of the vehicle 2 is sent to the vehicle 2. The vehicle 2 can authenticate the user with administrator rights on the vehicle 2 (namely, the owner of the vehicle 2) by using the user authentication device 29. The function related to the safety of the vehicle 2 can thus be updated after the approval is obtained from the user with administrator rights. The license information regarding other functions (in other words, additional functions for traveling, autonomous driving, security, etc. of the vehicle 2) is sent to the user terminal 3. The user can therefore view the license information using the user terminal 3 he or she is familiar with, which improves user convenience.

The vehicle 2 and the user terminal 3, regardless of to which the license information is to be sent, may be configured so as not to receive the user's operation of giving his or her approval for the software update while the vehicle 2 is moving. As an example, an approval button displayed on the in-vehicle display 27 or the display 33 may be grayed out while the vehicle 2 is moving (including when the vehicle 2 is ready to move, such as when the vehicle 2 is in Ready-ON state), and the in-vehicle display 27 or the display 33 may receive an operation of pressing the approval button only during the period in which the vehicle 2 is stopped (such as when the vehicle 2 is in Ready-OFF state or in parked state). The approval for the software update can thus be obtained in a safer condition.

Second Example

The functions for which the license information is set to be sent to the vehicle 2 is not limited to the functions related to the safety of the vehicle 2, and may include functions pre-registered (pre-selected) by the user.

Figure 6:
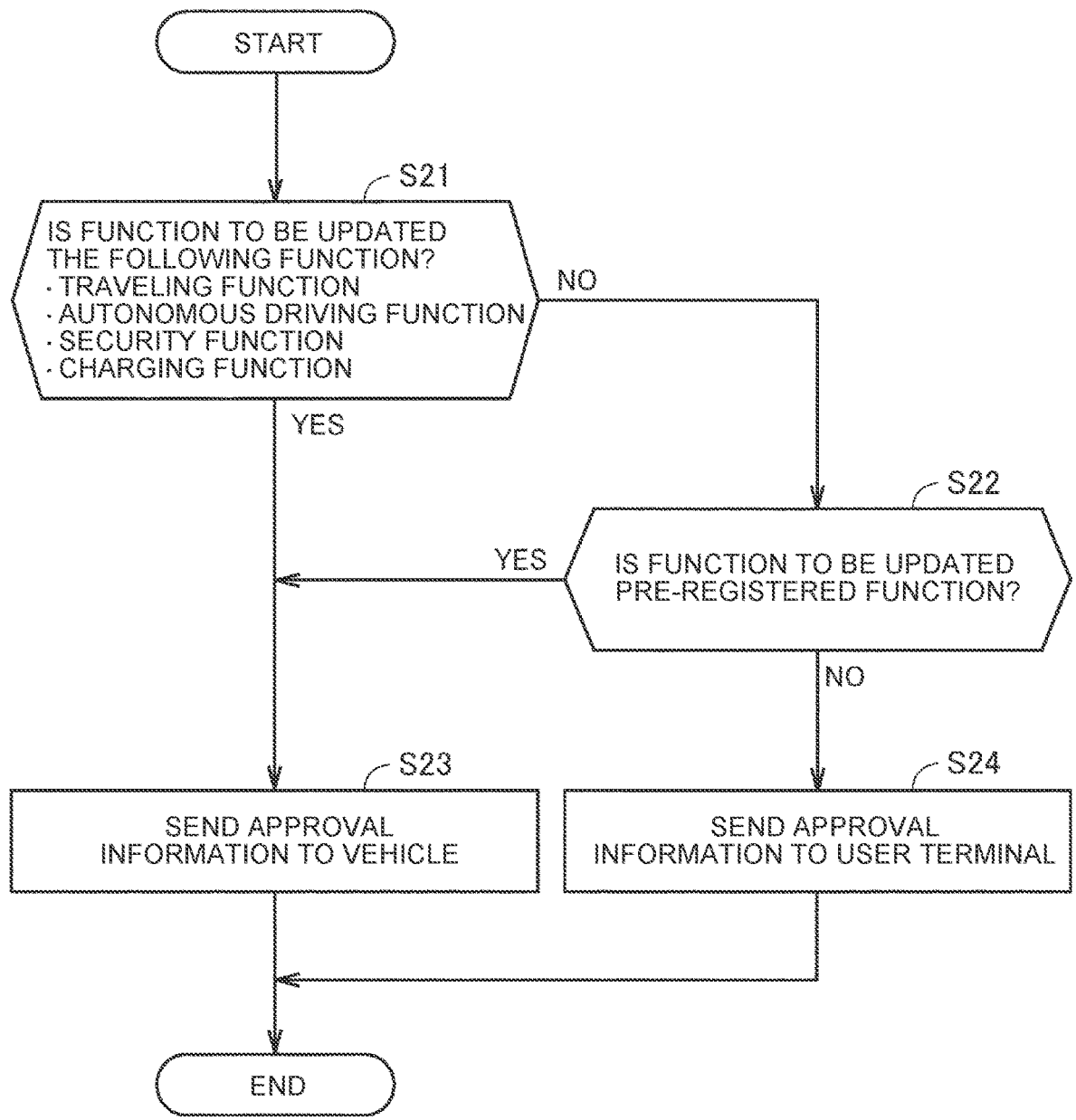
FIG. 6 is a flowchart showing a second example of the process of obtaining the user's approval for a software update.

FIG. 6 is a flowchart showing a second example of the process of obtaining the user's approval for a software update. As in the example shown in FIG. 5, in S21, the server 11 determines whether the function to be updated by the software update is a function related to the safety of the vehicle 2. When the function to be updated by the software update is a function related to the safety of vehicle 2 (YES in S21), the server 11 generates license information to be displayed on the in-vehicle display 27 and sends it to the vehicle 2 (S23).

When the function to be updated by the software update is not a function related to the safety of the vehicle 2 (NO in S21), the process proceeds to S22, and the server 11 determines whether the function to be updated by the software update is a function pre-registered by the user. When the function to be updated by the software update is a function pre-registered by the user (YES in S22), the server 11 generates license information to be displayed on the in-vehicle display 27 and sends it to the vehicle 2 (S23). On the other hand, when the function to be updated by the software update is not a function pre-registered by the user (NO in S22), the server 11 generates license information to be displayed on the display 33 of the user terminal 3 and sends it to the user terminal 3 (S24).

There may be users who want to make sure to give their approval also for functions other than the function related to the safety of the vehicle 2. Such users can pre-register functions that require their approval. Therefore, not only the license information regarding the function related to the safety of the vehicle 2 but also the license information regarding the function pre-registered by the user may be sent to the vehicle 2. Accordingly, even for the functions other than the function related to the safety of the vehicle 2, the approval can be obtained from the user with administrator rights before proceeding with a software update process.

Third Example

In the first and second examples, it is described that the license information is sent to the user terminal 3 in principle. However, the vehicle 2 may be the default destination to which the license information is to be sent.

Figure 7:
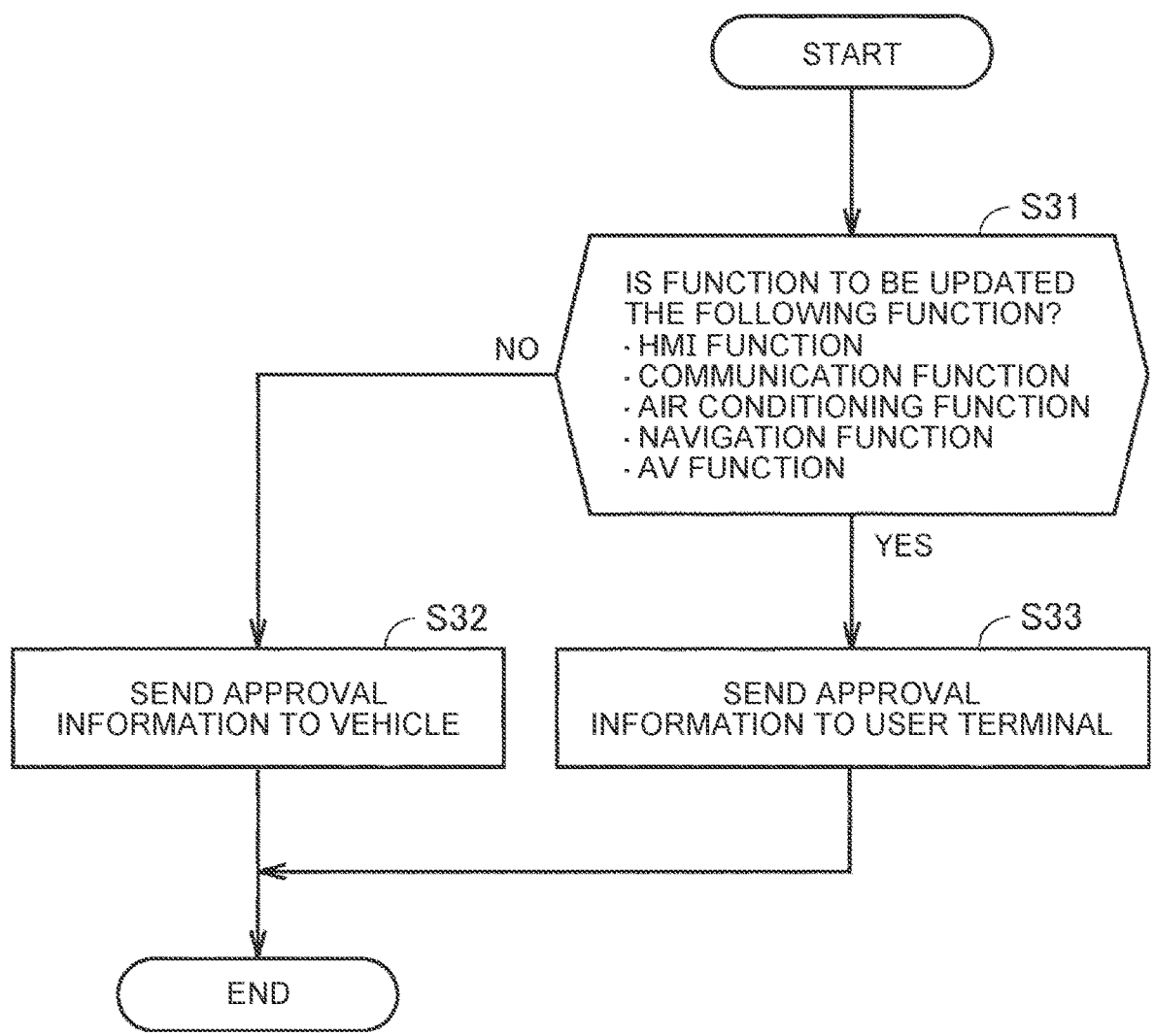
FIG. 7 is a flowchart showing a third example of the process of obtaining the user's approval for a software update.

FIG. 7 is a flowchart showing a third example of the process of obtaining the user's approval for a software update. In S31, the server 11 determines whether the function to be updated by the software update is a function related to the convenience and/or comfort of the vehicle 2. The function related to the convenience and/or comfort of the vehicle 2 includes, for example, at least one of the following functions of the vehicle 2: a Human-Machine Interface (HMI) function, a communication function, an air conditioning function, a navigation function, and an audio-visual (AV) function. The HMI function is implemented by the input device 26 and the in-vehicle display 27. The communication function is a so-called connected function (function related to communication between the vehicle 2 and the OTA center 1 or communication between the vehicle 2 and other vehicles), and is implemented by the DCM 28. The air conditioning function is implemented by an air conditioning system (heat pump air conditioner, electric heater, etc.), not shown. The navigation function is implemented by a navigation system, not shown. The audio-visual function is implemented by an in-vehicle audio system (not shown) etc.

When the function to be updated by the software update is a function related to the convenience and/or comfort of the vehicle 2 (YES in S31), the server 11 generates license information to be displayed on the display 33 of the user terminal 3 and sends it to the user terminal 3 (S33). On the other hand, when the function to be updated by the software update is not a function related to the convenience and/or comfort of the vehicle 2 (NO in S31), the server 11 generates license information to be displayed on the in-vehicle display 27 and sends it to the vehicle 2 (S32).

As described above, the license information regarding the function related to the convenience and/or comfort of the vehicle 2 is sent to the user terminal 3. The user can therefore view the license information using the user terminal 3 he or she is familiar with, which improves user convenience. On the other hand, the license information regarding the other functions is sent to the vehicle 2. Functions other than some functions related to the convenience and/or comfort can thus be updated after the approval is obtained from the user with administrator rights.

Fourth Example

The first and third examples may be combined.

Figure 8:
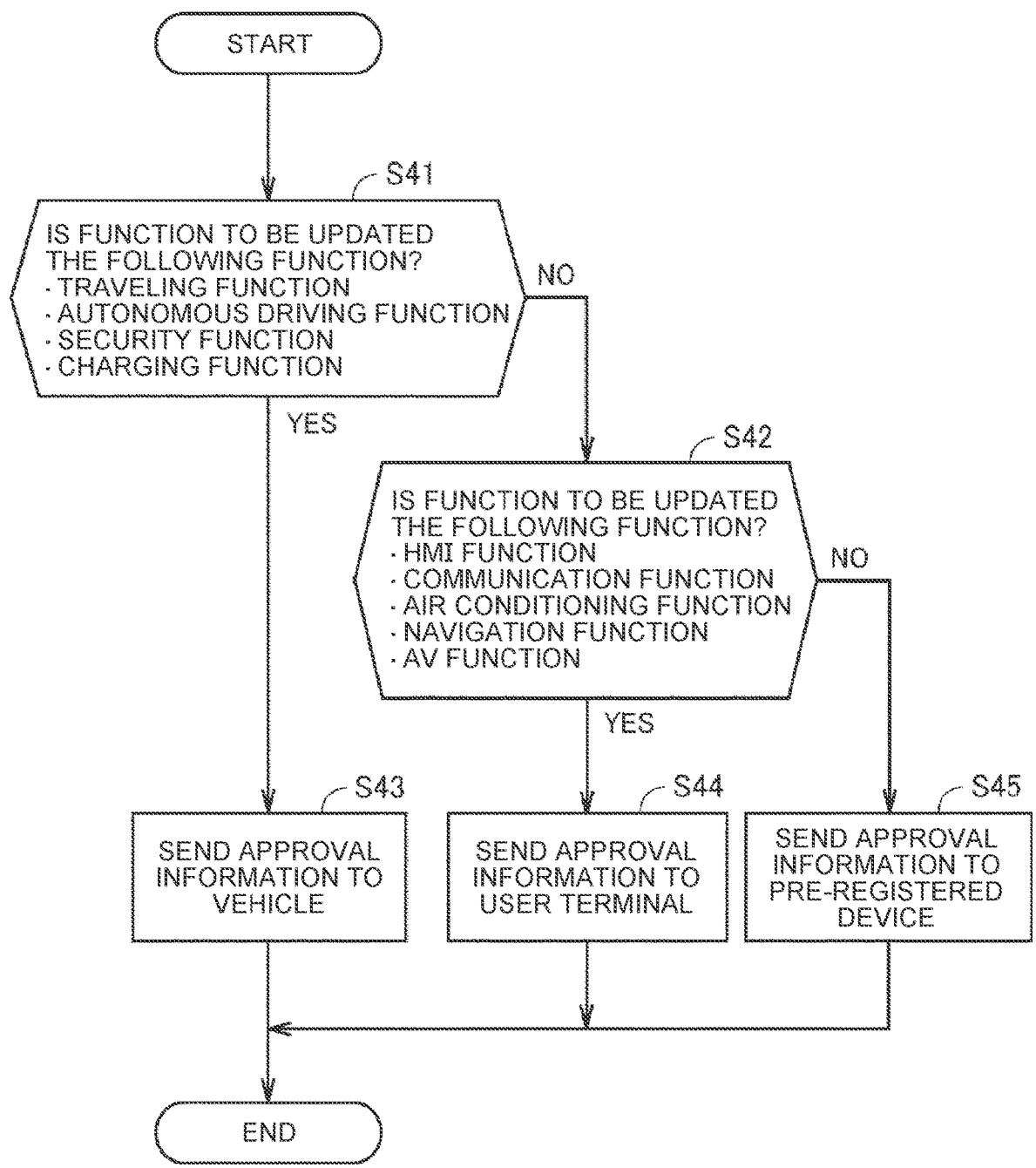
FIG. 8 is a flowchart showing a fourth example of the process of obtaining the user's approval for a software update.

FIG. 8 is a flowchart showing a fourth example of the process of obtaining the user's approval for a software update. In S41, the server 11 determines whether the function to be updated by the software update is a function related to the safety of the vehicle 2. When the function to be updated by the software update is a function related to the safety of vehicle 2 (YES in S41), the server 11 generates license information to be displayed on the in-vehicle display 27 and sends it to the vehicle 2 (S43).

When the function to be updated by the software update is not a function related to the safety of the vehicle 2 (NO in S41), the process proceeds to S42, and the server 11 determines whether the function to be updated by the software update is a function related to the convenience and/or comfort of the vehicle 2. When the function to be updated by the software update is a function related to the convenience and/or comfort of the vehicle 2 (YES in S42), the server 11 generates license information to be displayed on the display 33 of the user terminal 3 and sends it to the user terminal 3 (S44).

When the function to be updated by the software update is not a function related to the convenience and/or comfort of the vehicle 2 (NO in S42), the server 11 sends license information to a pre-registered device desired by the user (S45). That is, the server 11 sends the license information to the vehicle 2 when the user has registered the vehicle 2, and sends the license information to the user terminal 3 when the user has registered the user terminal 3.

As described above, according to the fourth example, the license information regarding the function related to the safety of the vehicle 2 is sent to the vehicle 2 as in the first and third examples. This makes sure that the approval of the user with administrator rights is obtained. The license information regarding the function related to the convenience and/or comfort of the vehicle 2 is sent to the user terminal 3. This can improve user convenience. Moreover, the license information regarding any function other than those mentioned above is sent to the pre-registered device. The user can thus select whether to prioritize making sure to give his or her approval or to prioritize improving convenience.

Fifth Example

The vehicle 2 may be used not only by the user with administrator rights (e.g. a parent), but also by a standard user who is under the supervision of the user and has no administrator rights (e.g. a child). There is some software that is primarily used by the standard user. The approval of the standard user may be obtained for updates of such software. The standard user corresponds to the "second user" according to the present disclosure.

Figure 9:
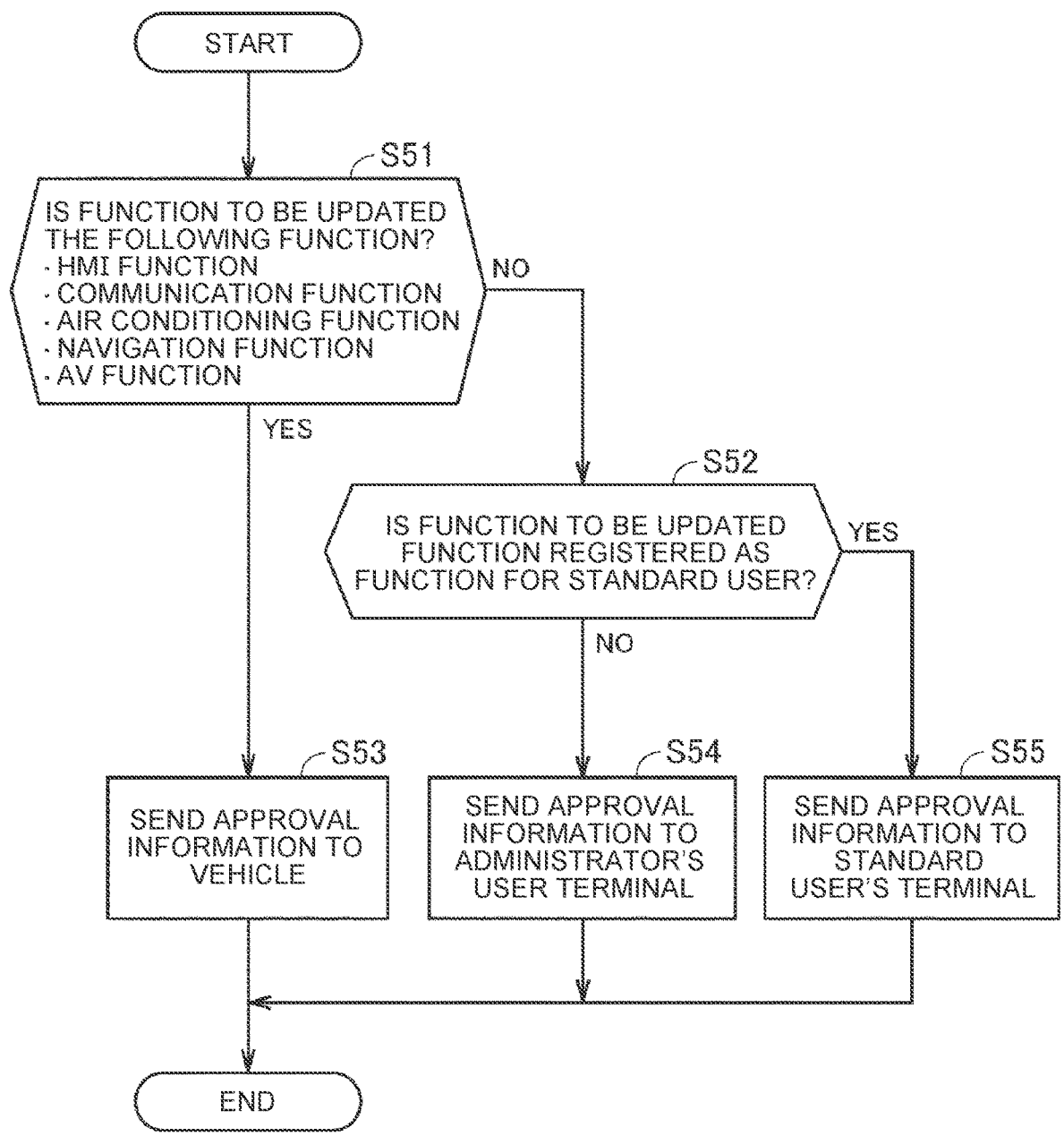
FIG. 9 is a flowchart showing a fifth example of the process of obtaining the user's approval for a software update.

FIG. 9 is a flowchart showing a fifth example of the process of obtaining the user's approval for a software update. In S51, the server 11 determines whether the function to be updated by the software update is a function related to the safety of the vehicle 2. When the function to be updated by the software update is a function related to the safety of vehicle 2 (YES in S51), the server 11 generates license information to be displayed on the in-vehicle display 27 and sends it to the vehicle 2 (S53). As a result, the approval of the user with administrator rights is obtained.

When the function to be updated by the software update is not a function related to the safety of the vehicle 2 (NO in S51), the process proceeds to S52, and the server 11 determines whether the function to be updated by the software update is a function pre-registered as a function to be used by the standard user. When the function to be updated by the software update is a function for the standard user (YES in S52), the server 11 generates license information to be displayed on a terminal (not shown) used by the standard user and sends it to this terminal (S55). As a result, the approval of the standard user with no administrator rights is obtained.

On the other hand, when the function to be updated by the software update is not a function for the standard user (NO in S52), the server 11 generates license information to be displayed on the user terminal 3 of the user with administrator rights and sends it to the user terminal 3 (S54). As a result, the approval of the user with administrator rights is obtained.

As described above, according to the fifth example, the license information regarding the function related to the safety of the vehicle 2 is sent to the vehicle 2. This makes sure that the approval of the user with administrator rights is obtained. The license information regarding any function pre-registered as a function to be mainly used by the standard user is sent to the standard user's terminal. The approval of the standard user who is most affected by the update of the function can thus be obtained. Moreover, the license information regarding any function other than those mentioned above is sent to the user terminal 3. This can improve convenience of the user with administrator rights.

Sixth Example

The first to fifth examples illustrate the case in which where to send the license information is determined according to the function to be updated by the software update. The sixth example illustrates the case in which where to send the license information is determined according to the amount of update data of software.

FIG. 10 is a flowchart showing the sixth example of the process of obtaining the user's approval for a software update. In S61, the server 11 determines whether the amount of update data of software (data size of software to be sent from the server 11 to the vehicle 2) is larger than a predetermined reference amount. When the amount of update data is larger than the reference amount (YES in S61), the server 11 generates license information to be displayed on the in-vehicle display 27 and sends it to the vehicle 2 (S62). On the other hand, when the amount of update data is equal to or less than the reference amount (NO in S61), the server 11 generates license information to be displayed on the display 33 of the user terminal 3 and sends it to the user terminal 3 (S63).

Typically, when the amount of update data is large (so-called major update etc.), it is very likely that the function to be updated by the software update includes a main function. On the other hand, when the amount of update data is small (such as regular security patch distribution), the software update may only include relatively small function improvements. Therefore, when the amount of update data is larger than the reference amount, the license information is sent to the vehicle 2. This makes sure that the approval of the user with administrator rights is obtained before updating the software. On the other hand, when the amount of update data is equal to or smaller than the reference amount, the license information is sent to the user terminal 3 the user is familiar with. This improves user convenience.

As described above, in the present embodiment, when the function to be updated by the software update is a function related to the safety of the vehicle 2, or when the amount of update data is larger than the reference amount, the license information is sent to the vehicle 2. This makes sure that the approval of the user with administrator rights on the vehicle 2 (owner) is obtained. On the other hand, when the function to be updated by the software update is a function related to the convenience and/or comfort of the vehicle 2, or when the amount of update data is equal to or less than the reference amount, the license information is sent to the user terminal 3. The user can therefore view the license information using the user terminal 3 he or she is familiar with, which improves user convenience.

The embodiment disclosed herein should be construed as illustrative in all respects and not restrictive. The scope of the present disclosure is shown by the claims rather than by the above description of the embodiment and is intended to include all modifications within the meaning and scope equivalent to the claims.

A server according to a first aspect of the present disclosure is configured to update software of a control device of a vehicle through wireless communication. The server includes: one or more memories storing a program; and one or more processors that execute the program. The one or more processors are configured to control, according to content of the software update, whether to send license information to the vehicle or to send the license information to a user terminal that is operable by a user who has administrator rights on the vehicle, the license information being information for obtaining approval for the software update from the user.

In the first aspect, the one or more processors may be configured to send the license information to the vehicle when a function to be updated by the software update is a first function related to safety of the vehicle, and may be configured send the license information to the user terminal when the function to be updated by the software update is a second function other than the first function.

In the first aspect, the first function may include at least one of the following functions of the vehicle: a traveling function, an autonomous driving function, a security function, and a charging function.

In the first aspect, the second function may include a function related to at least one of convenience or comfort of the vehicle. In the first aspect, the function related to the at least one of convenience or comfort may include at least one of the following functions of the vehicle: a Human-Machine Interface (HMI) function, a communication function, an air conditioning function, a navigation function, and an audio-visual function.

According to the first aspect and the configuration described above, the license information is sent to the vehicle when the function to be updated by the software update is the first function related to the safety of the vehicle etc. This makes sure that the approval of the user with administrator rights is obtained. On the other hand, when the function to be updated by the software update is the second function other than the first function, such the function related to the at least one of convenience or comfort of the vehicle, the license information is sent to the user terminal. This can improve user convenience. The approval to update software of an ECU can thus be appropriately obtained.

In the first aspect, the one or more processors may be configured to send the license information to the vehicle when the function to be updated by the software update is a function registered by the user.

According to the above configuration, it is possible to satisfy the desire of the user who wants to make sure to give his or her approval also for functions other than the first function related to the safety of the vehicle.

In the first aspect, the one or more processors may be configured to send the license information to a terminal that is operable by a second user when the function to be updated by the software update is a function registered as a function to be used by the second user, the second user being a user under supervision of the user.

According to the above configuration, for the license information regarding the function registered as a function to be mainly used by the second user, the approval of the second user who is most affected by the update of this function can be obtained.

In the first aspect, the one or more processors may be configured to send the license information to the vehicle when an amount of update data of the software is larger than a predetermined amount, and may be configured to send the license information to the user terminal when the amount of update data is equal to or smaller than the predetermined amount.

Typically, when the amount of update data is small, the software update may only include relatively small function improvements. However, when the amount of update data is large, it is very likely that the function to be updated by the software update includes a main function. Accordingly, in the above configuration, when the amount of update data is larger than the reference amount, the license information is sent to the vehicle. This makes sure that the approval of the user with administrator rights is obtained. On the other hand, when the amount of update data is equal to or smaller than the reference amount, the license information is sent to the user terminal. This improves user convenience.

In the first aspect, the license information may be output in such a manner that an operation of giving the approval for the software update by the user is not received while the vehicle is moving.

According to the above configuration, the user's operation to give his or her approval for the software update will not be received while the vehicle is moving. In other words, the user's operation will be received only during the period in which the vehicle is stopped. The approval for the software update can thus be obtained in a safer condition.

A non-transitory storage medium according to a second aspect of the present disclosure is a non-transitory storage medium storing instructions that are executable by one or more processors and that cause the one or more processors to perform functions for updating software of a control device of a vehicle through wireless communication. The functions include: sending license information to the vehicle or a user terminal that is operable by a user who has administrator rights on the vehicle, the license information being information for obtaining approval for the software update from the user; and when sending the license information, controlling whether to send the license information to the vehicle or to send the license information to the user terminal according to content of the software update.

A software update method according to a third aspect of the present disclosure is a software update method for updating software of a control device of a vehicle through wireless communication, the software update method being performed by one or more processors. The software update method includes: sending license information to the vehicle or a user terminal that is operable by a user who has administrator rights on the vehicle, the license information being information for obtaining approval for the software update from the user; and when sending the license information, controlling whether to send the license information to the vehicle or to send the license information to the user terminal according to content of the software update.

According to the second aspect or the third aspect, as in the configuration of the first aspect, the content to update software of an ECU can be appropriately obtained.

What is claimed is:

1. A server configured to update software of a control device of a vehicle through wireless communication, the server comprising:
   one or more memories storing a program; and
   one or more processors configured to execute the program, wherein the one or more processors are configured to
   determine a function that is related to content of a software update, and
   according to the determined function, send license information to either the vehicle or to a user terminal that is operable by a user who has administrator rights on the vehicle, the license information being information for obtaining approval for the software update from the user.

2. The server according to claim 1, wherein the one or more processors are configured to
   send the license information to the vehicle when a function to be updated by the software update is a first function related to safety of the vehicle, and
   send the license information to the user terminal when the function to be updated by the software update is a second function other than the first function.

3. The server according to claim 2, wherein the first function includes at least one of the following functions of the vehicle: a traveling function; an autonomous driving function; a security function; and a charging function.

4. The server according to claim 2, wherein the second function includes a function related to at least one of convenience or comfort of the vehicle.

5. The server according to claim 4, wherein the function related to the at least one of convenience or comfort includes at least one of the following functions of the vehicle: a Human-Machine Interface function; a communication function; an air conditioning function; a navigation function; and an audio-visual function.

6. The server according to claim 2, wherein the one or more processors are configured to send the license information to the vehicle when the function to be updated by the software update is a function registered by the user.

7. The server according to claim 2, wherein the one or more processors are configured to send the license information to a terminal that is operable by a second user when the function to be updated by the software update is a function registered as a function to be used by the second user, the second user being a user under supervision of the user.

8. The server according to claim 1, wherein the one or more processors are configured to send the license information to the vehicle when an amount of update data of the software is larger than a predetermined amount, and send the license information to the user terminal when the amount of update data is equal to or smaller than the predetermined amount.

9. The server according to claim 1, wherein the license information is output in such a manner that an operation of giving the approval for the software update by the user is not received while the vehicle is moving.

10. A non-transitory storage medium storing instructions that are executable by one or more processors and that cause the one or more processors to perform functions for updating software of a control device of a vehicle through wireless communication, the functions comprising:

determining a function that is related to content of a software update, and sending license information to the vehicle or a user terminal that is operable by a user who has administrator rights on the vehicle, the license information being information for obtaining approval for the software update from the user; and according to the determined function, sending the license information; to either the vehicle or to the user terminal.

11. A software update method for updating software of a control device of a vehicle through wireless communication, the software update method being performed by one or more processors and comprising:

determining a function that is related to content of a software update, and sending license information to the vehicle or a user terminal that is operable by a user who has administrator rights on the vehicle, the license information being information for obtaining approval for the software update from the user; and according to the determined function, sending the license information; to either the vehicle or to the user terminal according to content of the software update.

* * * * *